March 24, 1942.    A. H. FEYENS    2,277,091
APPARATUS FOR PURIFICATION OF LIQUIDS BY ELECTRO-OSMOSIS
Filed Dec. 15, 1937
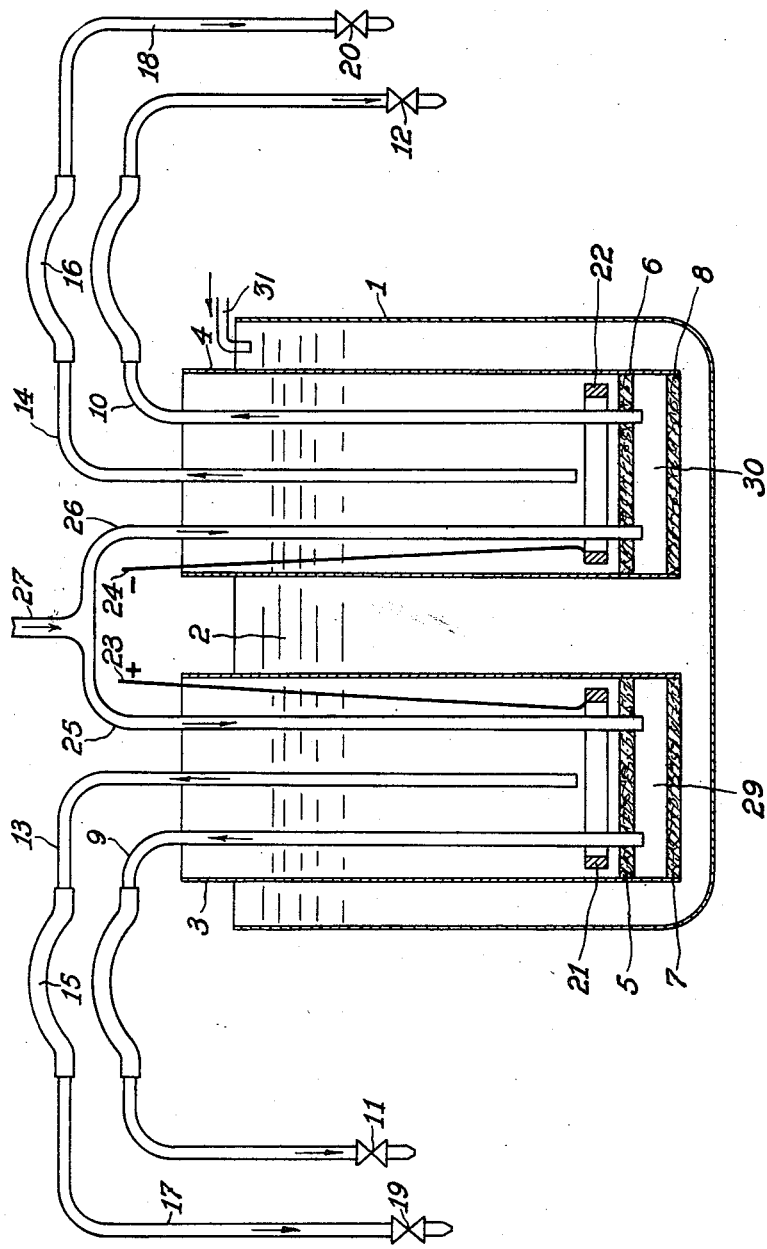
INVENTOR:
ALFRED HUBERT FEYENS
BY Haseltine, Lake & Co.
ATTORNEYS Patented Mar. 24, 1942

2,277,091

UNITED STATES PATENT OFFICE 2,277,091

APPARATUS FOR PURIFICATION OF LIQUIDS BY ELECTRO-OSMOSIS

Alfred Hubert Feyens, Brussels, Belgium

Application December 15, 1937, Serial No. 179,812
In Belgium December 19, 1936

2 Claims. (Cl. 204—301)

Several apparatus are in existence in which the phenomena generally known under the name electro-osmosis are employed for purifying water.

These apparatus generally comprise three adjacent compartments separated by filtering walls, the central compartment containing the liquid to be purified, whilst the two others contain the electrodes about which are concentrated, under the influence of the electric field and according to their polarity, the matter which it is desired to extract from the water in the central compartment. In general the separation between the central and lateral compartments is formed by a filtering wall which extends over the whole height of this separation and which then partially emerges from the water to be treated. The deposits of extracted matter which are formed on the walls thus have unequal thicknesses, which militates against the efficient functioning of these walls.

In the known apparatus, it is very difficult to avoid the back-diffusion of the elements extracted from the central compartment as soon as a certain concentration has been reached in the electrode-compartments. To diminish these deleterious effects the majority of existing apparatus are provided either with very large electrode-compartments, or they are provided with means permitting of the dilution of the solution, which, in the electrode-compartments, tends to grow richer under the action of the phenomena of electro-osmosis; this method of proceeding is bound to increase the expenditure of current.

These known apparatus are of such high price that the process of purification by electro-osmosis has only given rise to applications of small extent.

The present invention provides a method permitting of the construction of extremely cheap apparatus and it provides means suitable to prevent back-diffusion, whilst avoiding the great losses of liquid and current now permitted.

Apparatus according to the invention are so conceived as to permit of being formed by simple assemblages of members moulded from cheap material which resists electrolysis, e. g. glass, ceramic material and the like. Known apparatus are always formed by assemblages of walls very difficult to render liquid tight, whilst according to the invention, the electrode-chambers are formed by drums independent of the ensemble of the apparatus and simply plunged into the mass of liquid to be treated.

The filtering walls are situated at the lower part of these drums or tubes and are, opposite to what is usual, completely immersed and may be, when such is useful, at a great distance from the surface of the liquid; in this way, the deposits which are finally made on the filtering walls will have uniform thicknesses and the functioning of these walls will not be disturbed.

Back-diffusion will be prevented by making removals of liquid in the electrode drums, so as to produce across the filtering walls and in an opposite sense, a current if liquid which will oppose the return of the particles extracted.

The construction according to the invention permits of arranging very great differences of level between the electrode-drums and the liquid to be treated; as the velocity of the current of water across the filtering walls depends on the difference of level and on the permeability of the walls, it will be possible, according to the invention, to employ great differences of level and walls of small permeability.

By interposing between the liquid chamber and the electrode-chambers, one or more intermediate compartments separated from the latter and each other by filtering walls and in which removals of water are made.

Similarly, the invention permits of bringing into being an apparatus susceptible of functioning without interruption, so as to obtain a continuous delivery of purified liquid.

This is made to take advantage of the fact discovered by the inventor that, under the action of electro-osmosis, there gathers in the vicinity of the filtering walls on their side opposing the electrodes a layer of highly purified water. By fitting a second wall this pure water can be collected at a rate constant with the speed of its formation and so an apparatus is formed which gives a continuous flow of purified water.

Merely by way of example, one method of carrying out the object of the invention is hereinafter described, with reference to the diagrammatic drawing annexed, which shows a sectional view of an apparatus for carrying out the process in accordance with the invention.

The water 2 to be treated is contained in a receptacle 1 in which are partially immersed drums or tubes 3 and 4 which are open at their upper ends, whilst their lower ends are closed respectively by filtering walls 5 and 7 and 6 and 8.

The walls 5, 6 are traversed by tubes 9 and 10 which terminate outside the apparatus in taps 11 and 12; the tubes 9 and 10 might obviously penetrate in any other manner into the compartments 29 and 30, bounded respectively by the drums or tubes 3 and 4 and the walls 5, 7 and 6, 8.

Tubes 13 and 14 are immersed into the drums or tubes 3 and 4 above the walls 5 and 6 and are connected by flexible tubes 15 and 16 to tubes 17 and 18 which terminate outside the apparatus in taps 19 and 20.

Electrodes 21 and 22 are respectively connected by conductors 23 and 24 to the positive and negative poles of a source of electric current.

Under the influence of the electric field, the ionized elements in solution in the liquid 2 begin to travel according to their respective polarity, some across the filtering walls 5, 7, others across the filtering walls 6, 8 towards the electrodes 21, 22. The mixture or the solution 2 will grow weaker whilst the elements extracted will concentrate in the liquid contained in the chambers constituted by the drums or tubes 3 and 4.

The assemblies 13, 15, 17, 19 and 14, 16, 18, 20 form syphons of which the extremities provided with taps 19 and 20 can, owing to the flexible tubes 15 and 16, be adjusted in height, so as to maintain in chambers 3 and 4 an adjustable level independent of that of the liquid 2. When the said taps are completely open, the discharge of these syphons is a function of the height of the difference of level and of the permeability of the filter walls.

By the tubes 9 and 10, removals may be made from the compartments 29 and 30 situated between the walls 5, 7 and between the walls 6, 8. The tubes 9 and 10 may be also provided with a flexible portion so that the height at which the liquid removed from 29 and 30 is discharged to the exterior may be regulated and so that by this means the importance of this removal as a function of the permeability of the filtering walls 7 and 8 may be made to vary.

By tubes 25 and 26 which may unite at 27, raw liquid or liquid already purified may be introduced between the walls 5, 7 or 6, 8.

This adduction may be performed in the anode and cathode compartments or in one of them only.

It is obvious that the effect of these arrangements may be increased by disposing in series several compartments bounded by a plurality of filtering walls of equal or different surface, according to the results sought after, and that one or more of these chambers may be drained or fed.

The power of attraction or of repulsion of the electrodes obviously functions with greater force in chambers 29 and 30 than in the body of the liquid 2. If, furthermore, and by suitable means for example those indicated in the invention, back-diffusion through walls 5 and 6 or any one whatever of the consecutive walls, is prevented it will follow that the liquid situated in these chambers bounded by the filtering walls will be rapidly purified and one will be able by tubes mounted in the same way as tubes 9, 10 with taps 11, 12, continually to remove the purified water. If, in the container 1 or in the chambers 29, 30 in proportion to this removal raw liquid is supplied in amount equivalent to the liquid removed as by pipe 31, the apparatus can function without stopping with continuous delivery of purified water.

What I claim is:

1. In an apparatus for the purification of liquids by electro-osmosis, means forming a liquid receiving chamber, two containers insertable into said chamber, a positive electrode in one container, a negative electrode in the other container, each of said containers having impervious vertical walls separating the interior thereof from the interior of said chamber, and having an opening in the bottom portion thereof, and at least two spaced filtering walls below the electrode and within said imprevious vertical walls closing said opening and forming a compartment therebetween and so disposed as to be completely immersed when said chamber is filled with liquid and the container is inserted therein, and means to withdraw purified liquid from at least one of said compartments.

2. In an apparatus for the purification of liquids by electro-osmosis, means forming a liquid receiving chamber, two containers insertable into said chamber, a positive electrode in one container, a negative electrode in the other container, each of said containers having impervious side walls separating the interior thereof from the interior of said chamber, and having an opening in the bottom portion thereof, at least two substantially horizontal spaced filtering walls within said impervious side walls and below the electrode and closing said opening to form a compartment therebetween and so disposed as to be completely immersed when said chamber is filled with liquid and the container is inserted therein, and means to withdraw purified liquid from at least one of said compartments.

ALBERT HUBERT FEYENS.